F. E. BESSLER.
TIRE.
APPLICATION FILED SEPT. 27, 1919.

1,414,543.

Patented May 2, 1922.

F. E. Bessler, Inventor

Witness

By C. A. Snow & Co.
Attorneys

UNITED STATES PATENT OFFICE.

FRANK E. BESSLER, OF AKRON, OHIO.

TIRE.

1,414,543.  Specification of Letters Patent.  Patented May 2, 1922.

Application filed September 27, 1919. Serial No. 326,756.

*To all whom it may concern:*

Be it known that I, FRANK E. BESSLER, a citizen of the United States, residing at Akron, in the county of Summit and State of Ohio, have invented a new and useful Tire, of which the following is a specification.

The device forming the subject matter of this application is a tire, and one object of the invention is to provide a structure of the kind above mentioned, which will not be liable to damage through puncture.

A further object of the invention is to improve the construction of the casing and the core of the tire body so that these parts will have the necessary resiliency, combined with the desired strength.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
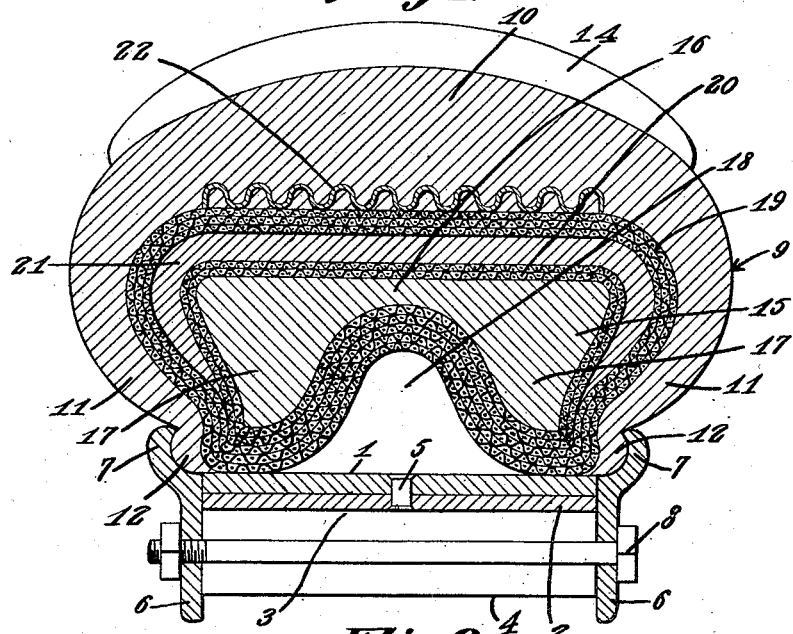
Figure 2:
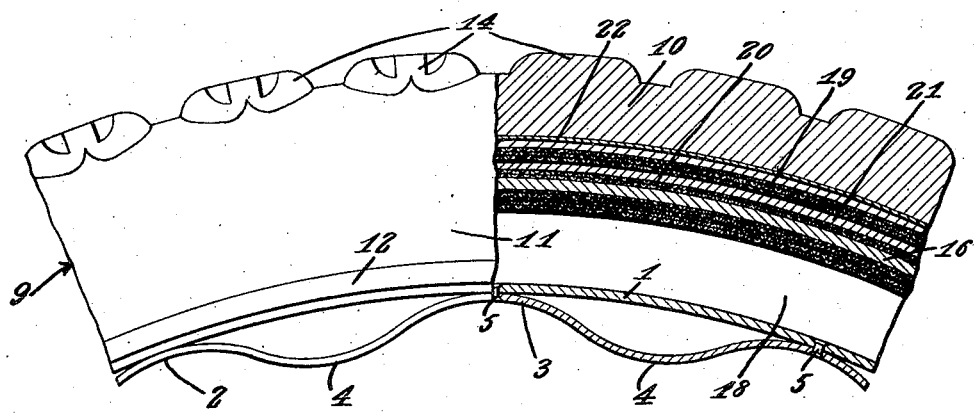

Figure 1 shows in cross section, a tire constructed in accordance with the invention; Figure 2 is a side elevation wherein parts appear in section.

In carrying out the invention there is provided a resilient circumferential band 1 which preferably is made of metal. A resilient circumferential strip 2, also made of metal, preferably, is located within the band 1 and has undulations 3 and 4, the undulations 4 being spaced from the band 1, and the undulations 3 being connected with the band by means of securing elements 5. Retainers 6 engage the sides of the band 1 and the strip 2, and are provided with clincher flanges 7. The structure above alluded to relates to a spring wheel construction, which cannot be claimed in this application. The said spring wheel construction is not abandoned or dedicated to the public, since it forms the basis of a claim in my co-pending application for Letters Patent on a resilient wheel, Serial No. 326,755, filed on Sept. 27, 1919. The retainers 6 are united by connecting members 8, which may be bolts.

The numeral 9 marks a tire casing, preferably made of rubber and comprising a tread 10 and side wings 11, the side wings having beads 12 cooperating with the clincher flanges 7. The tire casing 9 has a non-skid surface 14. Disposed within the casing 9 is a core 15 made of rubber, the rubber of the core 15 being much more resilient than the rubber out of which the casing 9 is made. The core 15 includes a tread 16, which is flat on its outer surface, and side wings 17. The side wings 17 define a cavity 18 in the inner curve of the core. The inside of the casing 9 carries a lining 19 which, preferably, is formed of a textile material, the core 15 being completely surrounded by a similar lining. Along the tread 10 of the casing 9, and along the side wings 11 of the casing, as well as along the tread 16 of the core 15 and along the side wings 17 of the core, the linings 19 and 20 are spaced. Adjacent the longitudinal edges of the wings 17 of the core and adjacent the longitudinal edges of the wings 11 of the tread 10, the linings 19 and 20 are in contact and connected, the linings being in contact and connected, across the cavity 18 of the core. Thus, along the cavity of the core, the core is stiffened up and sustained by a plurality of layers representing the sum of the layers on the casing 9 and the layers on the core 15. A rubber cushion 21 is located between those portions of the linings 19 and 20 which are spaced, as aforesaid. A breaker-strip 22 is mounted in the casing 9 and, preferably, is of sinuous form, as shown in Figure 1.

Having thus described the invention, what is claimed is:—

A tire comprising a casing including a tread and side wings; a core in the casing and comprising a tread and side wings, the side wings of the core defining a circumferential cavity in the core; a lining in the casing, and a lining on the core, the linings being spaced along the treads and the wings, and being brought together adjacent to the longitudinal edges of the wings, the linings being extended transversely of the cavity, in conformity to the shape of the cavity, to form a reinforcement the thickness of which is equal to the combined thicknesses of both linings; a cushion between the spaced portions of the linings.

In testimony that I claim the foregoing as my own, I have hereto affixed my signature in the presence of two witnesses.

FRANK E. BESSLER.

Witnesses:
DOROTHY C. SABIN,
MABEL BENKHEUSER.